United States Patent Office 3,153,022
Patented Oct. 13, 1964

3,153,022
MONOMER-POLYMER ACRYLIC SIRUPS
William Harold Calkins and Walter Murray Edwards, Wilmington, Del., assignors to E. I. du Pont de Nemours and Company, Wilmington, Del., a corporation of Delaware
No Drawing. Filed Oct. 3, 1958, Ser. No. 765,068
5 Claims. (Cl. 260—86.1)

This invention relates to new compositions of matter containing partially polymerized methacrylates suitable for use as laminating compositions and more particularly to monomer-polymer sirups of methacrylic ester compositions in which the polymer contains polymerizable double bonds, processes for their preparation and use.

Prior to the present invention no wholly acrylate or methacrylate monomer-polymer sirup has been available to the fabricator that was stable, had a useful viscosity, and a polymer content having polymerizable double bonds, such that the sirup could be molded at a high rate to give, in the presence or absence of pigments, fillers or the like, markedly improved laminate articles, in which some or all of the copolymer present in the sirup was insoluble and had superior weathering, stiffness, and craze-resistant properties. This invention provides such sirups and methods of using them.

Objects of the present invention are to provide copolymer in monomers sirups that are stable to polymerization on storage and in which the polymer contains polymerizable double bonds; a process for producing these sirups; and processes for their polymerization and laminate products produced therefrom. Another object is to provide copolymer in monomers sirups of acceptable viscosity with relatively high concentrations of copolymer containing polymerizable double bonds. A further object is to provide copolymer in monomers sirups of acrylic and methacrylic esters in which some or all of the copolymer present in the sirup becomes insoluble during final molding and polymerization. Other objects and advantages of the invention will appear hereinafter.

The invention relates to the preparation of copolymer in monomers sirups having storage stability containing at least 15% by weight of a copolymer of methyl methacrylate with one or more polyfunctional compounds having these formulas:

$$CH_2=C-X-C=CH_2$$
$$\phantom{CH_2=C}|\phantom{X}|$$
$$\phantom{CH_2=C}R\phantom{X}R'$$

in which X is

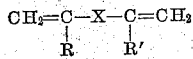, or 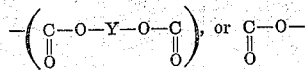

or phenylene —$C_6H_4$—, in which Y is an alkylene, polyalkylene, alkylene oxide, or polyalkylene oxide, and in which the R and R' groups are hydrogen and/or alkyl groups.

The aforesaid copolymers are formed in a mixture of monomeric methyl methacrylate and one or more of the aforesaid polyfunctional compounds, and the resulting sirup can be mixed with or absorbed by fibrous materials and thereafter molded, polymerized and cured to give weather-resistant articles which contain significantly less soluble polymer than was present in the original sirup. The sirups of the invention are shelf-stable, have a flowable viscosity to permit easy use, a ratio of copolymer to monomers to provide a minimum of shrinkage, and a minimum exotherm of polymerization, consistent with good physical properties of the product laminates. Moreover, the sirup can be polymerized to products having superior weatherability in which some or all of the copolymer present in the sirup is insoluble. Furthermore, the sirups of the invention contain cross-linking agents which produce fabricated plastic products on final polymerization that possess superior physical properties and surface qualities, and that are capable of being formed at the rapid rates demanded by modern industry.

Copolymer in monomers sirups of the invention are made from any suitable organic compound containing mono unsaturation such as vinyl acetate, styrene, alkyl acrylates, alkyl methacrylates, etc. and more especially from the methacrylic esters such as methyl methacrylate together with a cross-linking agent containing more than one unsaturated bond such as divinyl benzene, ethylene dimethacrylate, ethylene diacrylate, vinyl methacrylate, allyl methacrylate, methallyl methacrylate, diallyl itaconate, the dimethacrylic esters of diethylene glycol, triethylene glycol, tetraethylene glycol, etc. Methyl methacrylate may be used with other polymerizable compounds such as the acrylate esters and the like, in which use the methyl methacrylate constitutes at least 50% by weight of the resin content of the composition used. Such comonomers can be chosen to modify properties of the sirup and product laminates. Care should be exercised in choice of comonomer or comonomers so as not to affect adversely laminate weatherability, heat resistance, stability, etc.

Effectiveness for subsequent molding is obtained if a sirup has a relatively low exothermicity and a low shrinkage. A sirup with low exothermicity is one that on polymerization of its monomer content gives a minimum heat of reaction. Such a sirup is produced by increasing the polymer-to-monomer ratio, for the higher the polymer content, the lower will be the exothermicity of the polymerization of the sirup.

Monomer-polymer sirups disclosed in copending application, S.N. 694,513, have been made by partially polymerizing methyl methacrylate with the use of transfer agents and the proper type and quantity of initiator leading to storable and shippable sirups to which a cross-link agent may be added. The polymers in the sirups of that case contain no polymerizable double bonds and thus remain soluble on further polymerization, even in the presence of a crosslinking agent.

The sirups of the present invention having bulk viscosities in the range of 0.5 to 50 poises constitute balanced formulae-containing polymers of low inherent viscosity, 0.25 to 1.0, and preferably 0.30 to 0.60 and with correspondingly high polymer content and suitable quantities of crosslinking agents to provide optimum physical properties and desirable curing characteristics. The inherent viscosity is determined at 20° C. in chloroform solution at a concentration of 0.50 gram/100 ml., according to the method described in F. W. Billmeyer, Textbook of Polymer Chemistry, Interscience Publishing Inc. (1957), p. 128.

The sirup of the invention may be prepared by any suitable process such, for example, as by partially copolymerizing a monomer (i.e. methyl methacrylate) with an above-described polyfunctional compound by a process that will produce the prescribed sirup. By such a method, a suitable chain transfer agent is present during copolymerization of the monomers to limit the inherent viscosity in accord with prior art processes, such as aliphatic mercaptans having 1 to 18 carbon atoms as described in U.S. Patent 2,462,895, issued March 1, 1949 to Joseph L. Quinn. The reaction is catalyzed with only sufficient polymerization initiator to produce the desired amount of copolymer.

The sirup is made by heating a small amount of polymerization initiator in solution in an inhibitor-free mixture of an acrylic or methacrylic ester and a polyfunctional compound of the class described in the presence of a chain transfer agent at suitable pressure and temperature until the solution has reached a predetermined viscosity, thereafter the hot solution is quenched either by cooling with the subsequent addition of a polymerization inhibitor or by the addition of cold monomer containing a polymerization inhibitor.

More specifically, a sirup having a viscosity between about 1 and 50 poises at 25° C. and preferably between 2 and 15 poises at that temperature, can be produced from methyl methacrylate and 0.05 to 1.0 mole percent of said polyfunctional compound such as ethylene dimethacrylate in a stirred jacketed kettle under reflux at atmospheric pressure in the presence of a predetermined small amount of initiator (e.g. from 300 to 500 p.p.m.) of alpha,alpha'azodiisobutyronitrile and from 0.05 to 1.0 mole percent and preferably from 0.1 to 0.4 percent of a chain transfer agent. The amount of the polyfunctional compound used varies with the copolymerization characteristics of that compound with methyl methacrylate, for example allyl methacrylate, methallyl methacrylate and vinyl methacrylate are used in amounts from 0.05 to 10.0 mole percent. The resulting solution is heated at a temperature between 50 and 150° C. and preferably 95° C. to 105° C., until the predetermined viscosity has been attained and until the initiator content has been reduced to below 20 p.p.m. The polymerization is then stopped by cooling in any suitable manner, as, for example—and preferably—by the addition of from 1 to 10 percent by weight of cold methyl methacrylate containing sufficient hydroquinone to inhibit completely the polymerization of the methyl methacrylate.

The stable sirup thus prepared is an article of commerce that is sold to fabricators for use in molding operations. The fabricator mixes the stable sirup with a suitable polymerization initiator, and preferably a filler, and subjects the resulting mixture (or sirup if no filler is added) to a molding operation in which the sirup is converted to a solid shape simultaneously with the polymerization of its monomer content.

The sirup of the invention contrasts with previously described sirups in that the copolymer present in the sirup can undergo further polymerization to give a laminate or coating in which some or all of the copolymer originally present in the sirup has become insoluble. In addition, more cross-linking agent may be added to the sirup to improve fabricability, physical properties and the weathering of the molded product, particularly when fibrous reinforcement is present.

As shown in the examples, the copolymer content of the sirup may vary from 24 to 40% by weight of the sirup composition.

The examples which follow describe preferred embodiments of the invention for making the sirup in which parts are by weight unless otherwise noted.

EXAMPLE I

A stirred, water-jacketed kettle provided with a reflux condenser was charged with 116 parts of inhibitor—free, monomeric methyl methacrylate, 0.70 part of ethylene dimethacrylate and about 0.51 part of lauryl mercaptan. The resulting solution was heated to 80° C. ±1° C. and then 0.039 part of alpha,alpha'azobisisobutyronitrile dissolved in 5.3 part of methyl methacrylate added. The jacket temperature was adjusted to 80° C. ±5° C. and the kettle contents were allowed to reach reflux temperature, ca. 101° C. At the end of 25 minutes after the addition of the initiator, the reaction was quenched by the addition of a 25° C. solution containing 0.0049 part of hydroquinone dissolved in 10.7 parts of methyl methacrylate.

The resulting sirup had a viscosity of about 11 poises at 25° C., an inherent viscosity of about 0.62, a polymer content of about 24% and a good shelf stability, i.e., substantially no color change or viscosity change after 30 days.

EXAMPLE II

A stirred resin kettle fitted with a flux condenser and a water bath was charged with 2428 parts of inhibitor-free methyl methacrylate, 12.5 parts of ethylene dimethacrylate and 9 parts of lauryl mercaptan. The resulting solution was heated to 90°; 0.75 part of alpha,alpha'-azobisisobutyronitrile dissolved in 50 parts of methyl methacrylate was added. The water bath was removed and the kettle contents were allowed to reach reflux temperature, ca. 101° C. Samples were taken periodically from the reaction mixture and measured for viscosity. When the viscosity reached about 10 poises (on a sample cooled to 25° C.), the reaction mixture was quenched by cooling the flask in an ice-water mixture. This point was reached in about twenty-six minutes after the addition of the initiator. 0.088 part of hydroquinone was then dissolved in the resultant mixture.

The resulting sirup contained no detectable initiator, had a viscosity of about 10 poises at 25° C., had a polymer content of about 26%, an inherent viscosity of about 0.62 and a good shelf stability, i.e., substantially no color change or viscosity change after 30 days.

The process of Example II was substantially duplicated for the preparation of the following sirups which contain copolymers of methyl methacrylate and ethylene dimethacrylate, allyl methacrylate, or allyl acrylate. Laminates produced by the further polymerization of these sirups either with or without an additional crosslinking agent contain substantially less soluble polymer than does the sirup from which it was made.

*Table*

| Example | Compound Kind | Compound Amount (Percent) | Chain Transfer Agent d (Percent) | Methyl Methacrylate (Percent) | Inherent Viscosity in Chloroform | Copolymer Content of Sirup (Percent) | Viscosity at 25° C. | Soluble* Polymer in Laminate (Percent) |
|---|---|---|---|---|---|---|---|---|
| 3 | (a) | 0.10 | 0.36 | 99.54 | 0.45 | 30 | 15.5 | e 15 |
| 4 | (a) | 0.25 | 0.36 | 99.39 | 0.49 | 28 | 9.0 | e 10 |
| 5 | (a) | 0.40 | 0.36 | 99.24 | 0.63 | 29 | 30.0 | e 7 |
| 6 | (a) | 0.50 | 0.36 | 99.14 | 0.61 | 26 | 11.0 | e 4 |
| 7 | (b) | 3.0 | 0.36 | 99.64 | 0.48 | 28 | 9.0 | f 16 |
| 8 | (b) | 5.0 | 0.36 | 94.64 | 0.51 | 40 | 20.0 | f 6 |
| 9 | (b) | 8.0 | 0.36 | 91.69 | 0.53 | 28 | 11.0 | f 1 |
| 10 | (b) | 10.0 | 0.36 | 89.69 | 0.60 | 28 | 15.0 | f 1 |
| 11 | (b) | 5.0 | 1.0 | 94.00 | 0.27 | 37 | 13.0 | |
| 12 | (b) | 8.0 | 1.0 | 91.00 | 0.29 | 39 | 22.0 | |
| 13 | (c) | 3.0 | 0.36 | 96.64 | 0.47 | 29 | 14.5 | c 11 | a Ethylene dimethacrylate.
b Allyl methacrylate.
c Allyl acrylate.
d Lauryl mercaptan.
e Sirup mixed with 0.85% benzoyl peroxide, 0.0% additional ethylene dimethacrylate and heated in a press at 115° C. for 7 to 10 minutes.
f Sirup mixed with 1.0% benzoyl peroxide and heated in a press at 115° C. for 7 to 10 minutes.
*=Extractable in chloroform at BP of chloroform.

Any suitable free-radical polymerization initiator may be used such as peroxygen initiator, e.g., benzoyl peroxide, diethyl peroxide, diisobutyl peroxide; the azo initiators of the Hunt Patent U.S. 2,471,959 issued May 31, 1949, and the like. To produce a sirup, only part of the methyl methacrylate is polymerized. The initiators present in the sirup after polymerization will, even at or below room temperature, and at a slow rate, continue polymerization. Sirup that contains initiator is potentially viscosity-unstable. No more than small amounts of the initiator should be used, therefore, to insure that, when quenched, there is insufficient initiator remaining to cause undesirable polymerization.

Two factors govern the choice of conditions for a practical polymerization cycle. The conditions are such that the polymerization rate is fast enough to be economically attractive; secondly, the conditions should be such that the initiator is almost completely reacted. The polymerization rate can be calculated from the initiator concentration and temperature by equations well known in the chemical literature (see P. J. Flory, Principles of Polymer Chemistry, Cornell University Press (1953) p. 114). The approixmate amount of initiator which can be added to the polymerization system and still not have too much remaining after siruping can be calculated in accordance with the formula $X=10^{-3} \cdot 2Pt/H$, where X is the weight percent of initiator added prior to polymerization, H is the half-life of the initiator and $Pt$ is the polymerization time. Any acceptable method for measuring the half-life of the initiator can be used; for example, 40 grams of a solvent such as diphenyl ether, or another suitable solvent for the peroxide, is heated in a flask under an atmosphere of $CO_2$, up to the temperature at which the decomposition rate is to be measured, normally between 40° C. and 140° C. Two grams of the peroxide is added with stirring to the heated solvent, and samples of 4 to 6 grams of the solution are removed from the flask at predetermined intervals. The sample is collected under a $CO_2$ atmosphere, cooled immediately, and stored on Dry Ice. These samples are subsequently analyzed for peroxide content by the use of a standard iodometric method using starch as the indicator.

If peroxide concentrations are plotted against time on semi-log paper, a straight line is normally obtained, at least for the first few minutes of the reaction. The slope of this line is related to the velocity constant $k$ by the equation $$k = \frac{-d \ln c}{dt} \quad \left( \begin{array}{l} c = \text{concentration} \\ t = \text{time in minutes} \end{array} \right)$$

The half-life $= \frac{\ln 2}{k}$

The viscosity of the sirup can be measured by any standard method such as Gardner Tube, Brookfield Viscosimeter or the like. In the specification and claims, the viscosity given was measured by comparison with standard viscosity samples in Gardner viscosity tubes.

The sirups of the invention are marketed as such for a multiplicity of uses in which suitable polymerization initiators are added to polymerize completely the monomers contained in the sirup with or without cross-linking agents other than those described in the examples which may be added to the sirup at this stage, in amounts up to 20% by weight. Any suitable polyunsaturated, cross-linking agent may be used, such as, for example, propylene dimethacrylate, ethylene diacrylate, divinyl benzene, diallyl phthalate, triallyl cyanurate, etc.

The final polymerization is conducted by techniques similar to those presently used in polyester laminating and potting technology. The sirups may be mixed with inert additives such as glass fibers, powdered metals, pigments, natural and synthetic fibers and other toughening, filling, coloring and/or strengthening materials; sheets may be made by pouring the sirup on a corrugated or flat surface before or after a fabric, metal or glass layer is placed on the surface; and the sirup may be used as a laminating layer for wood, plastic and other surfaces. Subsequent to the aforesaid operations in matched metal molds, or by contact process, the sirup is polymerized under some pressure, e.g., 0.1 to 2000 p.s.i. and temperatures between room temperature and 150° C., to substantially 100% polymer or by any other suitable molding process. For optimum properties, the products should be cured under elevated temperatures up to 130° C. and pressures up to 1000 p.s.i. until the monomer content of the sirup has been reduced to a low level (preferably less than 1%). Where low pressures are used, it is sometimes necessary to eliminate dissolved gases by evacuation of the sirup prior to use.

The methacrylate sirups of the invention, due to their remarkable stability, are capable of being shipped from the point of manufacture to the fabricator without undesirable polymerization of monomer content. The fabricator is able to store the sirup without danger of polymerization until he wishes to use it. The sirup can then be combined with the fibers, fillers, etc., as described; molded, laminated or otherwise treated, without excessive exothermicity, to polymerize the monomer content to superior products.

We claim:

1. A stable sirup consisting essentially of methyl methacrylate monomer; a polymerizable monomer having the formula:

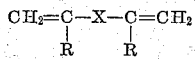

in which X is a member of the group consisting of divalent radicals having the formula:

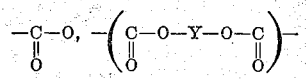

and phenylene $—(C_6H_4)—$, in which Y is a member of the group consisting of alkylene, polyalkylene, alkylene oxide and polyalkylene oxide radicals and in which the R substituents are members of the class consisting of hydrogen and alkyl groups; and copolymers of methyl methacrylate and said polymerizable monomer, the amount of said polymerizable monomer present in the sirup being from 0.05 to 10.0 mole percent of free and combined methyl methacrylate monomer and polymerizable monomer, said sirup having an initiator content of less than 20 parts per million and a viscosity of between .5 and 50 poises at 25° C., the copolymer being present in said sirup in the amount of 24 to 40% by weight of the sirup, said copolymer having an inherent viscosity of between 0.25 and 1.0 as determined in chloroform at concentrations of 0.5 g./deciliter at 20° C., said sirup containing a stabilizing amount of inhibitor.

2. The sirup of claim 1 in which the polymerizable monomer is ethylene dimethacrylate.

3. The sirup of claim 1 in which the polymerizable monomer is allyl methacrylate.

4. A process for the preparation of stable sirups which comprises adding a sufficient amount of free radical producing initiator to a mixture containing methyl methacrylate and a polymerizable monomer to produce a sirup having a viscosity between 0.5 and 50 poises at 25° C. and an initiator content of less than 20 parts per million, copolymerizing at a temperature between 50° C. and 125° C. said methyl methacrylate and said polymerizable monomer in the presence of an aliphatic mercaptan having 1 to 18 carbon atoms, to form a sirup containing copolymer, quenching the copolymerization reaction when the sirup has a viscosity between 0.5 and 50 poises at 25° C. and a copolymer content in the amount of 24 to 40% by weight of the sirup, said copolymer having an inherent viscosity of between 0.25 and 1.0, as determined in chloroform at concentrations of 0.5 g./deciliter at 20° C., said polymerizable monomer having the formula:

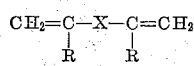

in which X is a member selected from the group consisting of divalent radicals having these formulas:

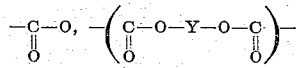

and phenylene —$(C_6H_4)$—, in which Y is a member of the group consisting of alkylene, polyalkylene, alkylene oxide and polyalkylene oxide radicals, and in which R substituents are members of the class consisting of hydrogen and alkyl groups; said polymerizable monomer being present in said sirup in the amount of 0.05 to 10.0 mole percent of free and combined methyl methacrylate monomer and polymerizable monomer, said aliphatic mercaptan being present at the beginning of the copolymerization step in an amount of 0.5 to 1 mole percent.

5. The process according to claim 4 in which the step of quenching the reaction is achieved by the addition of cold inhibitor.

References Cited in the file of this patent

UNITED STATES PATENTS

| | | |
|---|---|---|
| 2,335,133 | Renfrew | Nov. 23, 1943 |
| 2,349,768 | Strain | May 23, 1944 |
| 2,413,973 | Howk et al. | Jan. 7, 1947 |
| 2,462,895 | Quinn | Mar. 1, 1949 |

UNITED STATES PATENT OFFICE
CERTIFICATE OF CORRECTION

Patent No. 3,153,022 October 13, 1964

William Harold Calkins et al.

It is hereby certified that error appears in the above numbered patent requiring correction and that the said Letters Patent should read as corrected below.

Column 2, lines 37 and 38, for "crosslink" read -- crosslinking --; column 4, line 9, for "part" read -- parts --; columns 3 and 4, in the table, under the heading "Inherent Viscosity in Chloroform", first line thereof, for "0.45" read -- 0.46 --; same columns 3 and 4, under the table, footnote "e", for "0.0%" read -- 1.0% --.

Signed and sealed this 23rd day of February 1965.

(SEAL)
Attest:

ERNEST W. SWIDER
Attesting Officer

EDWARD J. BRENNER
Commissioner of Patents